United States Patent

Yoshida et al.

[11] 3,819,334
[45] June 25, 1974

[54] CATALYTIC REACTION APPARATUS FOR PURIFYING WASTE GASES CONTAINING CARBON MONOXIDE

[75] Inventors: Yoshinaga Yoshida; Toshiyuki Kii; Shigehiko Kobayashi; Kazuhide Miyazaki; Michiaki Yamamoto; Yasuo Seki, all of Tokyo, Japan

[73] Assignee: Mitsui Mining & Smelting Co., Ltd., Tokyo, Japan

[22] Filed: Oct. 6, 1971

[21] Appl. No.: 187,093

[30] Foreign Application Priority Data
Dec. 29, 1970 Japan................................ 45-130255
Oct. 27, 1970 Japan................................ 45-94521
Dec. 17, 1970 Japan................................ 45-113412

[52] U.S. Cl............ 23/288 F, 23/288 H, 23/288 K, 60/298, 60/299, 126/263, 165/133, 165/179, 423/213, 423/247
[51] Int. Cl.............................. F01n 3/14, B01j 9/04
[58] Field of Search....... 23/288 F, 288 H; 423/213, 423/214; 60/299, 298; 165/185; 126/263

[56] References Cited
UNITED STATES PATENTS

| | | | |
|---|---|---|---|
| 1,789,812 | 1/1931 | Frazer | 23/288 F UX |
| 1,932,927 | 10/1933 | Fischer | 23/288 F UX |
| 2,772,147 | 11/1956 | Bowen et al. | 23/288 F UX |
| 2,887,456 | 5/1959 | Halford et al. | 23/288 F UX |
| 3,100,140 | 8/1963 | Ashley et al. | 23/288 F |
| 3,109,715 | 11/1963 | Johnson et al. | 23/288 F UX |
| 3,172,251 | 3/1965 | Johnson | 23/288 F X |
| 3,208,131 | 9/1965 | Ruff et al. | 23/288 F UX |
| 3,211,534 | 10/1965 | Ridgway | 23/288 F X |
| 3,295,919 | 1/1967 | Henderson et al. | 23/288 F X |
| 3,441,382 | 4/1969 | Keith et al. | 23/288 F |
| 3,607,133 | 9/1971 | Hirao et al. | 23/288 F |

*Primary Examiner*—Barry S. Richman
*Attorney, Agent, or Firm*—Woodhams, Blanchard & Flynn

[57] ABSTRACT

A catalyst composition obtained by dispersing a power catalyst containing a hydrated oxide or oxides or manganese dioxide in an organic solution containing alkoxytitanate, alkoxy substituted organosilane or dimethyl polysiloxane or a catalyst composition obtained by dispersing a power catalyst in a heat-resisting paint prepared by utilizing a liquid compound having a siloxane bond as the vehicle. The catalyst is exposed moderately when it is adhered to a carrier when said catalyst composition is prepared by employing a catalyst whose principal components consist of manganese oxide or oxides and lead oxide or oxides and/or bismuth oxide or oxides, it is best suited for oxidation and purification of a waste gas containing carbon monoxide. Besides, catalyst reaction apparatuses prepared by making the foregoing catalyst composition adhere to a carrier consisting of plural metallic plates and connecting one end or both ends of said carrier with a metallic structure configured to be suitable for the purpose of cooling is effective in gas-solid heterogeneous catalytic reaction.

7 Claims, 12 Drawing Figures

CATALYTIC REACTION APPARATUS FOR PURIFYING WASTE GASES CONTAINING CARBON MONOXIDE

BACKGROUND OF THE INVENTION a. Field of the Invention

The present invention relates to a catalyst composition obtained by dispersing a mixture prepared by mixing at least 5 percent by weight of a hydrated oxide or oxides (expressed by the general formula MeOOH, wherein Me represents Fe, Ni or Mn) or manganese dioxide with a powder catalyst having manganese oxide or oxides and lead oxide or oxides and/or bismuth oxide or oxides for its principal components in an organic solution containing at least one member selected from the group consisting of alkoxytitanate, alkoxy substituted organosilane and dimethyl polysiloxane or a catalyst composition obtained by dispersing the foregoing catalyst in a heat-resisting paint prepared by utilizing a liquid compound having the siloxane bond as the vehicle, as well as a method of purifying a waste gas by the use of said catalyst compositions and catalytic reaction apparatuses for use in said purification.

b. Description of the Prior Art

The waste gas exhausted from gasoline engines in use for automobiles and so forth contains such harmful gases as hydrocarbons, nitrogen oxides, etc. as well as carbon monoxide in large quantities. Generation of carbon monoxide in particular is attributable to not only the gasoline engines of automobiles but also the internal combustion engines in use for aircrafts, construction machineries and so on, kilns and furnaces of factories, etc. as well as incomplete combustion of the fuel for gas stoves, kerosene stoves, etc., and thus it takes place all over the country. As the means to convert the carbon monoxide, which generation is most tremendous among these harmful gases, into harmless carbon dioxide through oxidation, application of a catalyst having manganese oxide or oxides and lead oxide or oxides for its principal components or a catalyst having manganese oxide or oxides and bismuth oxide or oxides for its principal components has heretofore been proposed. And, the thus composed catalysts for use in purification of waste gas have proved very effective in oxidation of carbon monoxide and the like to thereby purify the waste gas very efficiently.

These catalysts are usually supported by an appropriate carrier material. As the means of supporting such a catalyst by said carrier material, in addition to the so-called impregnation process to impregnate said carrier material with a solution containing salts of catalyst components, the co-precipitation process and the like are also applicable. However, the catalyst carriers prepared through these processes are not always provided with a satisfactory amount of catalyst adhering thereto, and, moreover, there are instances where the activity of the adhering catalyst shows a tendency of deterioration at the time of heat treatment of the catalyst carrier prior to the use thereof. Besides, the oxidation of carbon monoxide and/or hydrocarbons and the like is generally accompanied by the generation of heat, and in case of the waste gas being exhausted from automobiles, for instance, carbon monoxide content of about 5 percent therein will bring about a temperature rise of about 400°–500°C. Therefore, in order to maintain the purification of waste gas by the use of a catalyst in a satisfactory condition, it is required to make improvements not only on the catalyst per se but also on the structure of the reaction apparatus for use in gas-solid heterogeneous catalytic reaction employing said catalyst.

BRIEF DESCRIPTION OF THE DRAWING

In the appended drawings.

SUMMARY OF THE INVENTION

The first object of the present invention is to provide a method of facilitating the purification of a waste gas containing carbon monoxide.

The second object of the present invention is to provide a catalyst composition which is best suited for preparing a catalyst carrier suitable for use in making a waste gas harmless by chemically oxidizing carbon monoxide contained in said waste gas at a high temperature through gas-solid heterogeneous catalytic reaction.

The third object of the present invention is to provide a catalyst composition which can be applied on the surface of a carrier through coating, drying and baking.

The fourth object of the present invention is to provide a catalyst composition which can be made to adhere to a carrier of optional configuration as well as material, or to the inside of an exhaust system, in a simple way economically and efficiently.

The fifth object of the present invention is to provide a catalyst reaction apparatus comprising said catalyst composition adhering thereto, which is effective in purifying the waste gas and is free from wearing or powdering of the catalyst per se.

The sixth object of the present invention is to provide a catalyst reaction apparatus which is capable of providing proper thermal conditions for the catalyst by taking off an appropriate portion of heat values arising from the catalytic reaction to thereby prevent deterioration of the catalyst.

Another object of the present invention is to provide a catalyst reaction apparatus comprising the catalyst composition prepared under the present invention adhering thereto, which is suitable for installing in the exhaust system of automobiles.

One of the catalyst compositions under the present invention is prepared by dispersing a mixture obtained by mixing a hydrated oxide or oxides or manganese dioxide with a powder catalyst having manganese oxide or oxides and lead oxide or oxides for its principal components or a powder catalyst having manganese oxide or oxides and bismuth oxide or oxides for its principal components in a thermal condensation resin containing silicon or titanium. The catalyst reaction apparatus under the present invention is composed of plural metallic plates having the aforementioned or below-mentioned catalyst composition adhering to their surfaces, said metallic plates being disposed in strata by leaving spaces therebetween and fixed together by the both ends or the middle thereof.

To enlarge further upon the catalyst, the catalyst effective in purifying carbon monoxide, hydrocarbons, nitrogen oxides, etc. and applicable in the present invention includes a catalyst composed of manganese oxide or oxides, and lead oxide or oxides and/or bismuth oxide or oxides, a catalyst mainly composed of the foregoing oxides plus oxide or oxides of alkaline earth elements, transition metals, rare earth elements, aluminum, silicon, etc. and/or transition metal or metals such as copper, iron, cobalt, nickel, etc. Manganese oxide applicable to the foregoing catalyst includes $Mn_2O_3$, $Mn_3O_4$, $MnO_2$, etc. and $MnO_2$ is known as electrolytic manganese dioxide, chemical manganese dioxide or natural manganese dioxide. Lead oxide applicable to the foregoing catalyst includes PbO, $Pb_3O_4$, $Pb_2O_3$, etc., and bismuth oxide includes $Bi_2O_3$, $Bi_2O_3 \cdot nH_2O$, $Bi_2O_5$, $Bi_2O_5 \cdot H_2O$, etc.

The catalyst composition under the present invention is obtained by dispersing a mixture prepared by impregnating the foregoing catalyst with at least 5 percent by weight of a hydrated oxide or oxides (expressed by the general formula MeOOH, wherein Me represents Fe, Ni or Mn) or manganese dioxide in an organic solution containing at least one member selected from the group consisting of alkoxytitanate, alkoxy substituted organosilane and dimethyl polysiloxane.

Any of the hydrated oxides expressed by the foregoing general formula contains a small amount of water. Likewise, the manganese dioxide - irrespective of whether it is chemical manganese dioxide, natural manganese dioxide and electrolytic manganese dioxide - generally contains about 2 – 3 percent by weight of water, and particularly electrolytic manganese dioxide contains 5 percent by weight of water at the maximum.

The catalyst composition under the present invention requires the employment of such hydrated oxide or oxides as inherently containing water, but this of course does not preclude the use of other powder oxides together therewith, and the foregoing manganese oxide, bismuth oxide, lead oxide, etc. exemplify the catalyst components to be employed jointly. In order to further the effective adhesion of the catalyst to a carrier through the catalyst composition under the present invention, the amount of said hydrated oxide or oxides or manganese dioxide contained in the whole powder mixture is required to be more than 5 percent by weight. Said alkoxytitanate, alkoxy substituted organosilane and dimethyl polysiloxane to act as the binder for said catalyst composition under the present invention are those compounds which have heretofore been popular as the vehicle for use in paint, and to give concrete examples thereof, there are butoxytitanate (a product from hydrolysis of titanium tetrabutoxide), tetraethoxysilane, etc. Further, the present invention permits the use of organic aluminum compound such as trialkyl aluminum, triallyl aluminum or the like by mixing with the foregoing binder. The amount of said aluminum compounds on this occasion must be less than 10 percent of the amount of the binder, because, if it exceeds this limit, the thermal condensability of the binder will be impeded. The binder for use in the present invention is usually possessed of a viscosity of 100 – 200 centipoise so that it is advisable to dilute it with an appropriate organic solvent for practical use. The organic solvent to serve for this purpose includes aromatic hydrocarbons such as benzene, toluene, xylene, etc., alcohol such as methanol, ethanol, butanol, etc., ester such as butyl acetate, etc., and petroleum solvent such as petroleum ether, etc. The amount of such organic solvent to be employed is appropriately determined so that the content of said binder is in the range of 20 – 50 percent by weight of the total amount of the resulting solution.

The foregoing catalyst composition is obtained by adding the aforesaid powder catalyst containing a hydrated oxide or oxides to a binder solution diluted with an organic solvent and dispersing same therein, and the appropriate amount of said catalyst containing a hydrated oxide or oxides to be thus added ranges from the equivalent to the amount of the binder to an amount twice as much as that of the binder. The thus obtained dispersion (i.e., catalyst composition) is next made to adhere to the surface of an appropriate carrier and, subsequently, the resulting catalyst carrier is subjected to heat treatment.

The other catalyst composition according to the present invention is obtained by dispersing a catalyst having the aforesaid manganese oxide or oxides and lead oxide or oxides and/or bismuth oxide or oxides for its principal component in a liquid compound having siloxane bond, such as a heat-resisting paint employing a liquid silicone resin having cyclohexane bond, sodium metasilicate, etc. as the vehicle. Said heat-resisting paint is prepared by dispersing at least one member selected from the group consisting of thermostable inorganic oxides, such as titanium oxide ($TiO_2$), chromium oxide ($Cr_2O_3$), alumina ($Al_2O_3$), manganese dioxide ($MnO_2$), zirconium oxide (ZrO), etc., and, as organic compound, ethyl silicate [$Si(OC_2H_5)_4$], as the heat-resisting agent, in a liquid compound having siloxane bond as the vehicle usually in an amount ranging from the equivalent to twice as much as the latter. The heat-resisting efficiency of said catalyst composition lowers in proportion to the mixing ratio of the catalyst, so that it is desirable to apply the mixing ratio of the catalyst to the heat-resisting paint in the range of about 75:25 – 25:75 by weight and determine the mean particle size of the catalyst to be more than 10 times as large as that of the heat-resisting agent in order to aptly balance the deterioration of the catalyst and the deterioration of the heat-resisting paint as set forth in the following. It is also desirable to determine the viscosity of said heat-resisting paint to be lower than 62 Ku according to the Stormer method. The thus obtained dispersion (i.e., catalyst composition) is next made to adhere to an appropriate carrier, and thereafter, the resulting catalyst carrier is subjected to heat treatment.

For the purpose of making the catalyst compositions of said two kinds adhere to a carrier, any appropriate means such as the dipping process wherein the carrier is dipped in the catalyst composition concerned, the spray process wherein the catalyst composition concerned is coated by spraying onto the surface of a carrier, the brush-coating process, the roll-coating process, etc. can be applied. No limitation is placed on the carrier in the present invention with regard to the material, configuration and dimensions thereof, that is, various carriers having different dimentions and composed of such materials as carborundum, silica, porcelain clay, cement, etc. molded into the shape of pellet, cylinder or honeycomb, metals such as iron, copper, nickel, etc. formed into the shape of wire, net or plate, are applicable.

The last step of the process for making the first catalyst composition adhere to a carrier is accomplished by drying the catalyst carrier at room temperature for about 12 hours, heating it at about 50° – 250°C for about 30 – 100 minutes thereafter, and further heating it at about 400° – 600°C for about 10 – 60 minutes subsequent thereto. The optimum condition of heat-treatment on this occasion is to dry said catalyst carrier at room temperature for about 12 hours, thereafter subject it to heat-treatment at about 150°C for 90 minutes or thereabout and subsequently subject it to heat-treatment at about 450°C for 30 minutes or thereabout, providing that, when circumstances require it, in lieu of said drying at room temperature for 12 hours, a heat-drying at 50°C or thereabout for 30 – 60 minutes in the wake of drying at room temperature for a short time may be applied. By virtue of the foregoing heat-treatment, said catalyst composition forms a film which moderately exposes the powder catalyst on the surface of the carrier. The details of the mode in which the catalyst comes to adhere to the carrier is yet to be clarified, but it is supposed that a film having a network is formed through the thermal condensation reaction of the binder as expressed by the following model reaction formula and the powder catalyst is not only firmly held on the surface of the carrier by virtue of this film but also is maintained in a state of being moderately exposed through the openings of said network.

Model reaction formula:

(wherein Me represents Ti or Si, and R represents alkyl radical or allyl radical.)

Meanwhile, the last step of the process for making the second catalyst composition adhere to a carrier is accomplished by drying the catalyst carrier at the room temperature and thereafter baking it usually at 300° – 500°C for 2 – 5 hours. In case of this catalyst composition, the particle size of catalyst is remarkably larger than that of the heat-resisting agent, so that the catalyst particles tend to protrude from the surface of the coating film to get exposed, and this tendency can be furthered especially by lessening the surface tension of the binder appropriately by any known method. The resulting coating film of this catalyst composition has such a merit that, when its service extends over a long period of time, the surface of the catalyst initially exposed on the surface of said coating film deteriorates to be accompanied by deterioration and extinction of the paint holding the catalyst, resulting in exposure of new catalyst surfaces or exposure of fresh catalysts previously hidden within the coating film one after another, whereby the catalytic reaction can be always stabilized.

Application of these catalyst compositions under the present invention can practically dispense with the remodeling of the conventional exhaust pipe, muffler, etc. and makes it possible to utilize their surfaces which contact with the exhaust gas as the catalyst carrier as they stand, so that the purification of waste gas can be accomplished very easily.

For instance, in case of the exhaust system for the internal combustion engine of automobiles, i.e., the channel for discharging the waste gas being exhausted from said engine into the air through the exhaust manifold, the joint pipe, the first muffler and the second muffler in order, the catalyst compositions according to the present invention can be made to adhere to the inside or surface of said exhaust system either partially or entirely to thereby perform the purification of waste gas. If said joint pipe is too short to effect a thorough contact between the waste gas and the inside thereof, the joint pipe may be elongated or some obstacles may be provided on its inside so as to disorder the flow of waste gas more or less. No limitation is placed on the configuration of such obstacles, but it is advisable to devise it so as to make the contact surface thereof as broad as possible providing that the flow of waste gas will not be excessively disturbed thereby.

The catalyst to be applied to the catalyst compositions under the present invention is not required to be of single kind; plural catalysts different in catalytic performance may be employed, as occasion demands, to thereby prepare various catalyst compositions to be coated on the separate places in the exhaust system as assigned to each composition. There are instances where the waste gas can be made harmless more efficiently by the employment of two kinds of catalysts different in the temperature for activation thereof and making the catalyst composition comprising a catalyst activatable at a relatively low temperature adhere to the first muffler while making the catalyst composition comprising a catalyst activatable at a relatively high temperature adhere to the second muffler.

Meanwhile, one of the catalyst reaction apparatuses according to the present invention is of such construction that plural metallic plates having the foregoing catalyst compositions adhering to their surfaces are disposed in strata by leaving spaces therebetween, the plates having fixed thereon, at one or both ends thereof, metallic structures having a configuration suitable for cooling thereof. Another catalyst reaction apparatus according to the present invention is of such construction that plural metallic plates are disposed in strata by leaving spaces therebetween, fixed and partitioned in the middle by means of one holding plate or two holding plates crossing them perpendicularly, and provided with the catalyst compositions under the present invention adhering to said metallic plates in strata on one half or the central part thereof.

Figure 1:
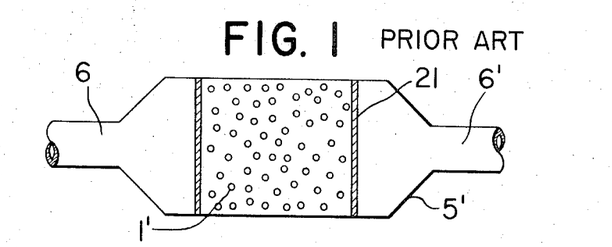
FIG. 1 is a diagrammatic cross-sectional view representing the structure of known reaction apparatuses for use in effecting purification of the waste gas by use of a catalyst.

As the means of purifying the exhaust gas, a catalyst reaction apparatus put in a catalyst container of such construction as shown in FIG. 1 is generally employed. In said FIG. 1, the numeral reference 5' denotes the catalyst container, 6 denotes the inlet for the unpurified exhaust gas, 6' denotes the outlet for the purified exhaust gas, 1' denotes the catalyst, usually of pellet type, and 21 denotes the wire-netting. According to this catalyst reaction apparatus, an unpurified exhaust gas which flows in the catalyst container (5') through the inlet (6) is subjected to oxidation or reduction by the catalyst (1') and is discharged through the outlet (6') as a harmless gas after purification of, say, $CO_2$ contained therein.

However, a catalyst reaction apparatus of such construction as above is still possessed of many shortcomings as follows.

1. The flow resistance of the exhaust gas, to wit, its backpressure against the entine is so high that the output of the engine gets reduced.

2. The catalyst is gradually powdered by the vibration arising from the traveling of automobiles as well as the vibration transmitted from the engine and comes out from said wire-netting (21) to be discharged to the outside.

3. Due to the heat retained by the exhaust gas as well as the heat generated from the reaction between said exhaust gas and catalyst, the temperature of the catalyst becomes fairly high and, when it exceeds a specific degree, gives rise to deterioration of said catalyst.

These shortcomings not only bring about the lowering of the efficiency of the automobile concerned but also considerably hamper the satisfactory performance of the purification of exhaust gas.

The catalyst reaction apparatus under the present invention has dispelled all such shortcoming in the prior art. That is, one of the catalyst reaction apparatuses according to the present invention is of such construction that plural metallic plates having the aforesaid catalyst compositions adhering to their surfaces are disposed in strata by leaving spaces therebetween and fixed onto another metallic structure having such a configuration as convenient for cooling by the both ends thereof. And, this apparatus is installed in a catalyst container in such a fashion that the inside of said metallic structure constitutes the two wall-surfaces of the passage for the exhaust gas when said apparatus is equipped in the exhaust system of an automobile.

A detailed explanation of the present invention will be given hereunder with reference to the appended drawings.

Figure 4:
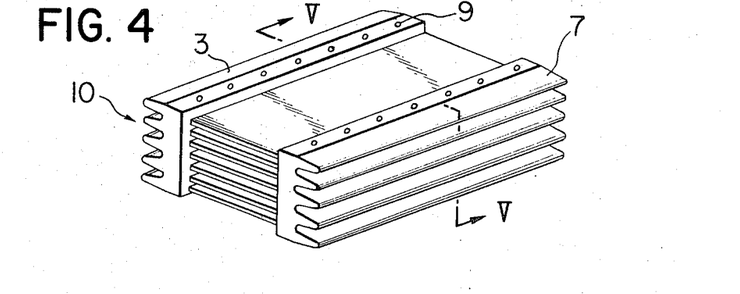
FIG. 4 is a diagrammatic perspective view of the catalyst reaction apparatus according to the present invention to be accommodated in a catalyst container.
Figure 5:
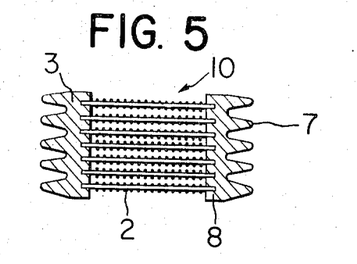
FIG. 5 is a diagrammatic cross-sectional view taken along the line (V)—(V) in FIG. 4.

The catalyst reaction apparatus under the present invention is as shown in FIGS. 4 and 5. To be precise, it is a catalyst reaction apparatus wherein plural metallic plates (i.e., metallic plate-shape carrier (2)) (2) .... carrying the catalyst composition (1) made to adhere to their surfaces firmly by baking or other appropriate means in the wake of coating or spraying are fixed on other metallic structures (3) having a configuration convenient for cooling by the both ends thereof.

Figure 6:
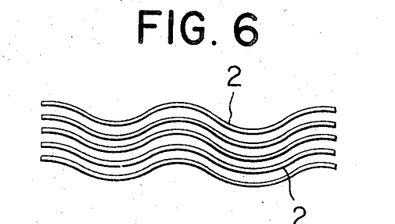
FIGS. 6 and 7 are diagrammatic side-views of the examplifying configurations of the metallic plate-type carrier constituting a part of the catalyst reaction apparatus according to the present invention.
Figure 7:
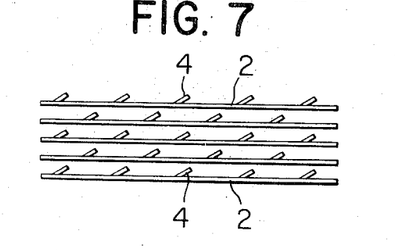
Figure 8:
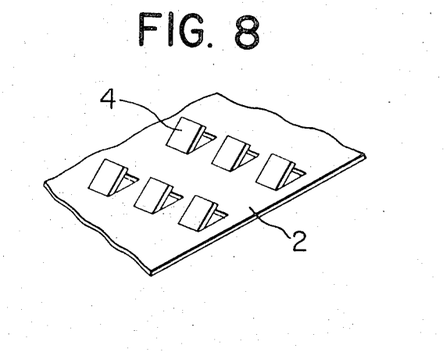
FIG. 8 is a diagrammatic perspective view of the same metallic plate-type carrier as shown in FIG. 7.
Figure 9:
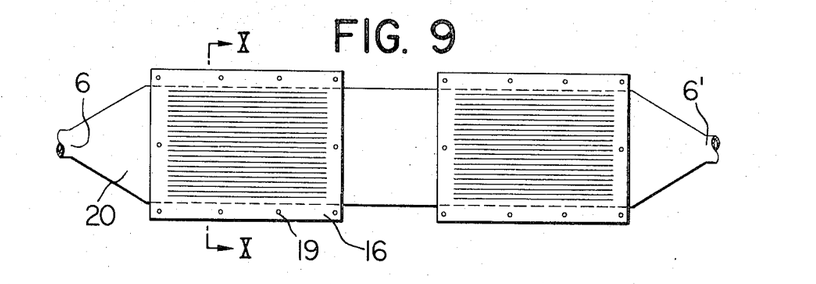
FIG. 9 is a diagrammatic side-view of another catalyst reaction apparatus according to the present invention.

The size, number, etc. of said metallic plate-shape carrier (2) can be varied as occasion demands. Its configuration is not limited to a perfect plane figure; rather it is desirable to construct it by corrugating or sectionally providing a multiplicity of projections (4) (4) ... . on a flat plate as exemplified in FIGS. 6 through 8 to give rise to a turbulent flow of exhaust gas to ensure its satisfactory contact with the catalyst. In so doing, the thermal deformation of the metallic plate-shape carrier (2) can be also avoided. However, the point is to configure it so as to give rise to a turbulent flow of the exhaust gas which has come in the catalyst container (5) through the inlet (6), augment the contact area for the contact between the exhaust gas and the catalyst, and prolong the time for effecting the contact. The spaces between the neighboring metallic plate-shape carriers can be determined appropriately. The metallic structures (3) and (3) having a configuration convenient for cooling which hold the both ends of said plural metallic plate-shape carriers (2) (2) .... are composed of a plurality of fins (7) (7) .... and the retaining members (8) and (8). The retaining members (8) and (8) are provided with, say, several tapped holes (9) (9) .... for the purpose of installing the present catalyst reaction apparatus (10) on the catalyst container (5) in demountable fashion. The retaining members (8) and (8) hold the metallic plate-shape carrier (2), and the fin (7) cools said metallic plate-shape carrier (2) to thereby serve for prevention of the rise in temperature of the catalyst.

The present catalyst reaction apparatus (10) consists of an assemblage of the metallic plate-shape carriers (2) (2) .... having said catalyst composition (1) and the metallic structures (3) (3), but, in case of practically manufacturing this apparatus, it is made vibration-proof by such means as making the catalyst compositions under the present invention adhere to metallic plate-shape carriers and thereafter enclosing these carriers in a cast metal casing or sandwiching them in between two metallic structures (3), (3) or welding, fitting or setting to the metallic structures (3), (3). Adhesion of the catalyst compositions to the metallic plate-shape carrier is not required to be performed prior to the assembly of the apparatus; it will do to perform it after said assembling. Further, it will do to make the catalyst compositions adhere to also the inside of said metallic structures (3), (3) by its portion coming into contact with the exhaust gas in the same way as in the foregoing.

Besides, if necessary, the metallic plate-shape carrier (2) is coated with plural catalyst compositions (1), each of which contains a catalyst having different properties mutually. There are various catalysts different in the activation temperature and the catalytic effect on various gases, so that it is possible to prepare such a catalyst reaction apparatus as being concurrently effective not only for, say, CO, HC but also $NO_x$ by properly combining various catalysts having different properties, and this object can be accomplished by, for instance, assembling a plurality of metallic plate-shape carriers (2), each of said carriers being coated with plural kinds of catalyst compositions (1) comprising different catalysts applied thereto separately or assembling a plurality of metallic plate-shape carriers (2), each of said carriers being coated with a catalyst composition (1) containing a catalysts having different properties mutually.

Figure 2:
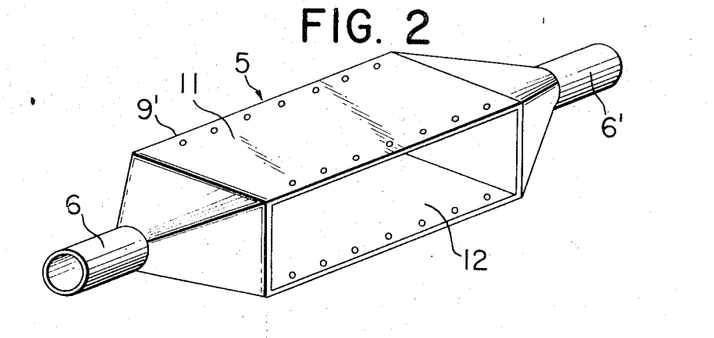
FIG. 2 is a diagrammatic perspective view of an example of the catalyst container to accommodate the catalyst reaction apparatus according to the present invention.
Figure 3:
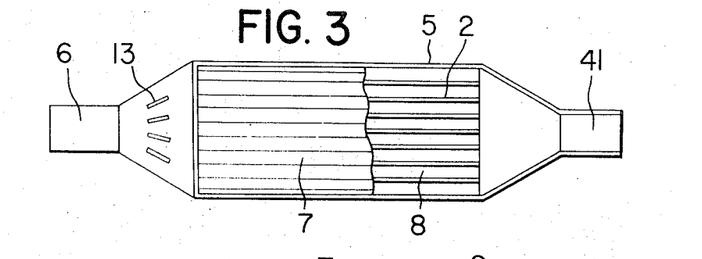
FIG. 3 is a sketch of the apparatus according to the present invention as accommodated in a catalyst container and shown by breaking away a portion of said container.

The foregoing catalyst reaction apparatus is installed in the catalyst container (5) having the both sides thereof removed as shown in FIG. 2. This catalyst container (5) is just like the conventional container (5') exemplified in FIG. 1 after having the both side walls thereof removed. The top wall (11) and the bottom wall (12) are provided with the tapped holes or piercing holes (9') (9') . . . . . at the places corresponding to the tapped holes (9) (9) . . . . . provided on the retaining members (8) (8) of the metallic structures. And, the top wall (11) and the bottom (12) are preferably disposed in parallel. The inside of the top wall (11) as well as the bottom wall (12) coming into contact with the exhaust gas may be also provided with the catalyst firmly adhering thereto in the same way as in case of the metallic plate-shape carrier. The catalyst container (5) and the catalyst reaction apparatus (10) are united in a body by putting screws in the tapped holes provided on them respectively. It is desirable to install a flow-dispersing plate (13) as shown in FIG. 3 between the inlet (6) and the catalyst reaction apparatus (10) within the catalyst container (5) for the purpose of dispersing the flow of gas. The fins (7) (7) . . . constituting a part of the catalyst reaction apparatus as installed in such a fashion as protruding outward from said catalyst container (5).

The inside of the thus installed metallic structures (3) (3) having a configuration convenient for cooling acts as the two wallsides of the passage for the exhaust gas.

Figure 10:
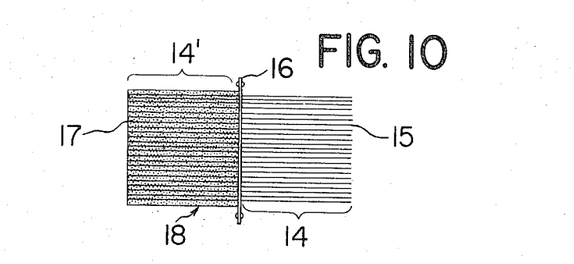
FIG. 10 is a diagrammatic cross-sectional view taken along the line (X)—(X) in FIG. 9.
Figure 11:
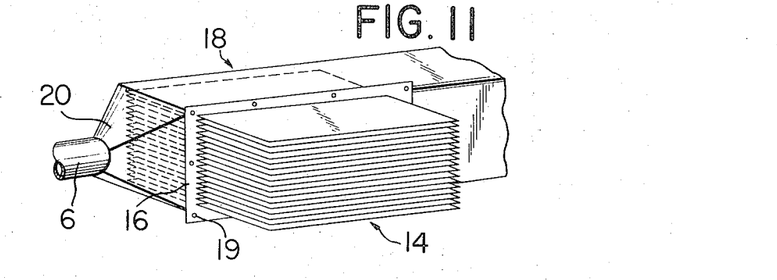
FIG. 11 is a diagrammatic fragmentary perspective view, on an enlarged scale, of the same catalyst reaction apparatus as in FIG. 9.
Figure 12:
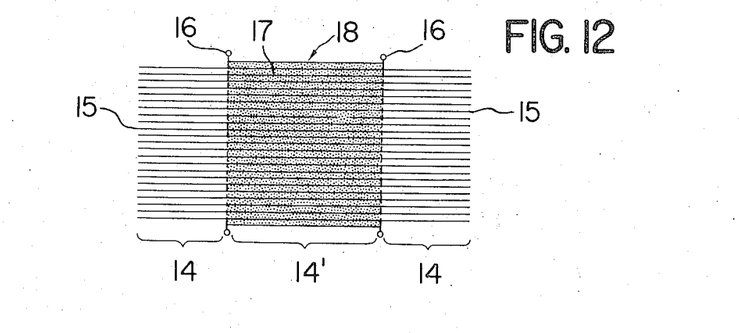
FIG. 12 is a diagrammatic cross-sectional view of still another catalyst reaction apparatus according to the present invention as taken along the same line as in FIG. 10.

Another catalyst reaction apparatus according to the present invention is of fin-shaped structure prepared by stratifying a plurality of practically flat plates (15) (15) . . . made of an appropriate metallic material such as iron, aluminum, copper, etc. while leaving spaces therebetween as shown in FIGS. 9 through 12. These flat plates (15) (15) . . . are fixed and partitioned by means of the holding plate (16) which crosses them at right angles, and the one section (14') of the thus partitioned fin structure carries the aforesaid catalyst compositions (17) under the present invention adhering thereto and constitutes the catalyst containing section (18). It will do as well to devise this kind of catalyst reaction apparatus in such a fashion as shown in FIG. 12, wherein a couple of holding plates (16) are provided so as to divide the fin structure into three sections and the central section is assigned to constitute the catalyst containing section (18). These catalyst reaction apparatuses are fixed in the catalyst container with the bolt (19) as shown in FIG. 11. In this case, it is a matter of course to so arrange that said catalyst containing section be located inside the catalyst container.

According to the above described apparatuses under the present invention, it is well possible to smooth the flow of exhaust gas and minimize the backpressure thereof against the engine. Besides, the catalyst is free from pulverization, and the provision of the cooling fins always prevent the rise in temperature of the catalyst and the deterioration thereof, so that the present invention is very effective for the purification of exhaust gas for a long period of time.

Although particular preferred embodiments of the present invention have been disclosed hereinabove with respect to the purification of the exhaust gas arising from automobiles, it will be understood that the present invention can of couse be aptly applied to the purification of other waste gases arising from, for instance, stoves, boilers and internal combustion engines other than that for use in automobiles. Besides, in case of the uses practically free from any vibration and not requiring any particular regard to the backpressure, as a method for containing the catalyst in the reaction apparatus, pelletized catalyst may be placed in the interstices between the metallic plates.

DESCRIPTION OF THE PREFERRED EMBODIMENTS

Given in the following are concrete examples embodying the present invention, but this does not mean to limit the scope of the present invention.

EXAMPLE 1

180 g of xylene was added to 190 g of a 50 percent solution of non-volatile silicon resin, and the resulting compound solution was mixed with equal weight (i.e. 370 g) of a powder catalyst (consisting of 80 parts of manganese dioxide and 20 parts of bismuth sesquioxide) and stirred, to thereby obtain a slurry. Subsequently, 780 g of carborundum pellets sized 4 mm in diameter and 4 mm in length each were added to said slurry, mixed thoroughly therewith by means of a rotary mixer, whereby the slurry was made to adhere to the surface of the pellets. These pellets coated by the slurry were spread in a heating furnace, dried therein at 50°C for 30 minutes, then heated at 150°C for 90 minutes, and further heated at 450° – 500°C for 30 minutes. Through the foregoing procedures, there were obtained 1,040 g of a pellet-shape catalyst carriers carrying said powder catalyst adhering firmly thereto, and these catalyst carriers demonstrated a satisfactory catalytic efficiency.

EXAMPLE 2

By adding butanol to a tetrabutyl titanate having a polymerization degree in the range of 400 – 600, a solution having the concentration of 20 percent in terms of titanate was prepared. 950 g of a powder catalyst consisting of 50 parts of managanese dioxide, 15 parts of bismuth sesquioxide and 35 parts of copper powder was added to 50 g of said solution and dispersed therein, and, thereafter, 2,000 g of alumina pellets sized 2 mm in diameter and 5 mm in length each were added to the resulting dispersion and mixed therewith. The carriers thus coated by a slurry containing said powder catalyst were dried by heating gradually, and thereafter were heated at 450° – 550°C for 30 minutes. Through the foregoing procedures, there were obtained 2,800 g of a catalyst carriers having a satisfactory catalytic efficiency.

EXAMPLE 3

By mixing butanol with ethyl silicate at the ratio of 1:1 by weight and thereafter mixing the same catalyst as in Example 1 to the resulting mixture and dispersing therein, a slurry was prepared. By dipping cylindrical carrier made of alumina cement sized 4 cm in diameter and 10 cm in length and provided with a multiplicity of holes piercing lengthwise in said slurry, the slurry adhered to the surface of said carrier as well as the side of each hole. Subsequently, the carrier was taken out from the slurry, dried by heating gradually, and further subjected to heating at 500° – 600°C. Through the foregoing procedures, there was obtained a honeycomb-shape catalyst carrier, and the catalytic efficiency of this catalyst carrier proved satisfactory.

EXAMPLE 4

This embodiment is for the purpose of evaluating the efficiency of the catalyst carriers prepared by the method according to the present invention through purification test for the exhaust gas arising from automobiles.

250 g each of the catalyst carriers prepared in the foregoing Examples 1, 2 and 3 and the commercialized oxidizing catalyst "Hopcalite" (principal components: manganese oxide, copper oxide, silver oxide, etc.) was put in a pipe, 50 mm in bore, respectively and packed therein in such a fashion as bringing about little resistance against the flow of exhaust gas. The exhaust gas [composition: CO 5 percent, $O_2$ 5 percent, $CO_2$ 9 percent, $N_2$ 78 percent, hydrocarbons (in terms of n-hexane) 500 ppm, others 3 percent] arising from a gasoline engine employing leaded gasoline for fuel was made to pass through said pipes at a temperature of 400° – 500°C and the rate of 100 l/min. As to the conditions for the flow of exhaust gas, for the purpose of evaluating the efficiency to meet the actual requirements, the experiments were conducted on the basis of an intermittent operation, namely, repetition of such operation that the exhaust gas was made to flow continuously for 8 hours a day, stopped flowing for 16 hours thereafter and again made to flow continuously as above, whereby the concentrations of CO as well as hydrocarbons in terms of n-hexane at the inlet and outlet of the pipe were analyzed by the use of a non-dispersive infraredray analyzer (NDIR). The results of said experiments were shown in the following Table 1.

exhaust gas arising from a gasoline engine, having a temperature in the range of 400° – 500°C and containing about 5 percent of free oxygen, was introduced into said muffler at the rate of 100 l/min, whereby the concentrations of CO at the inlet and the outlet thereof were measured. The results of a series of tests thus conducted were shown in the following Table 2.

prescription for catalyst composition:
catalyst [$MnO_2:Pb_3O_4:V_2O_5$ = 50:50:10]

| thermostable paint | | | to be mixed at the ratio of 50:50 by weight |
|---|---|---|---|
| | titanium oxide | 10% | |
| | chromium oxide | 20% | |
| | alumina | 35% | |
| | liquid silicon resin having cyclohexane bond | balance | |

Table 2

| Site of measurement | | Concentration of CO (%) |
|---|---|---|
| 1st test uz,1/32 | inlet (of muffler) | 7.2 |
| | outlet (do.) | 1.3 |
| 2nd test | inlet (of muffler) | 4.8 |
| | outlet (do.) | 0.9 |

As is evident from the foregoing Table 2, a muffler carrying the catalyst compositions under the present invention shows a superior efficiency in the purification of carbon monoxide and is effective for making the exhaust gas harmless.

EXAMPLE 6

The inside of the muffler of the exhaust system of an automobile was coated with a catalyst composition consisting of the catalyst and the thermostable paint according to the belowmentioned prescription, dried thereafter at the room temperature, and further subjected to baking at 350°C for 3 hours. Subsequently, an

TABLE 1

| | durable Catalyst period | Concentration of CO in purified gas (%) | | | | | | Concentration of hydrocarbons in purified gas (ppm) | | | | | |
|---|---|---|---|---|---|---|---|---|---|---|---|---|---|
| | | 10 hr | 50 hr | 100 hr | 200 hr | 300 hr | 400 hr | 10 hr | 50 hr | 100 hr | 200 hr | 300 hr | 400 hr |
| Prepared in Example 1 | more than 400 hr | 0 | 0 | 0 | 0 | 0.1 | 0.2 | 25 | 30 | 35 | 40 | 40 | 45 |
| Prepared in Example 2 | more than 400 hr | 0 | 0 | 0 | 0 | 0.5 | 0.6 | 25 | 30 | 40 | 40 | 50 | 50 |
| Prepared in Example 3 | more than 400 hr | 0 | 0 | 0 | 0 | 0.4 | 0.5 | 25 | 25 | 30 | 35 | 45 | 50 |
| Commercialized catalyst | 50 hr | 1.0 | — | — | — | — | — | 30 | 245 | — | — | — | — |

Remark: The durable period signifies the number of hours during which the concentration of CO in the purified gas was held below 2% and the concentration of hydrocarbons (in terms of n-hexane) was held below 50 ppm.

EXAMPLE 5

The inside of the muffler of the exhaust system of an automobile was dipped in a catalyst composition according to the below-mentioned prescription, dried thereafter at the room temperature, and further subjected to baking at 450°C for 4 hours. Subsequently, an exhaust gas arising from a gasoline engine, having a temperature in the range of 400° – 500°C and containing about 5 percent of free oxygen, was introduced into said muffler at the rate of 100 l/min., whereby the concentrations of CO at the inlet and the outlet thereof were measured. The results of a series of tests thus conducted were shown in the following Table 3.

prescription for catalyst composition:
CATALYST &MnO$_2$:Bi$_2$O$_3$ = 50:50 ]
thermostable paint

| titanium oxide | 15% | |
|---|---|---|
| chromium oxide | 5% | to be mixed at the ratio of 50:50 by weight |
| alumina | 30% | |
| liquid silicon resin having cyclohexane bond | balance | |

TABLE 3

| | Site of measurement | | Concentration of CO (%) |
|---|---|---|---|
| 1st test | inlet | (of muffler) | 7.2 |
| | outlet | (do.) | 1.4 |
| 2nd test | inlet | (of muffler) | 4.9 |
| | outlet | (do.) | 0.9 |

EXAMPLE 7

Test 1

Pellets of a catalyst consisting of 50 parts by weight of manganese dioxide and 50 parts by weight of lead oxide were packed in the conventional catalyst container made of iron, which container was installed in the exhaust system of an automobile.

Test 2

A slurry obtained by dispersing a powder catalyst having the same composition as that in Test 1 above in the same liquid as that in Example 3 was coated and baked on the plates of the catalyst containing section of a reaction apparatus according to the present invention as shown in FIG. 10, which apparatus was then placed in a catalyst container made of iron, which container was installed in the exhaust system of an automobile in the same way as in Test 1.

Test 3

The same pellets of a catalyst as in Test 1 were packed in the interstices of the catalyst containing section of the same apparatus as in Test 2 and the apparatus was installed in the exhaust system of an automobile in the same way as in Test 2 subsequent thereto.

In each test in the foregoing, the exterior of the catalyst container was subjected to forced cooling by means of a fan, and the temperature of each catalyst layer was measured. The results of the tests was shown in the following Table 4.

Table 4

| No. of test | Temperature of exhaust gas at the inlet of catalyst layer | Temperature of catalyst layer | | |
|---|---|---|---|---|
| | | after 10 min. | after 30 min. | after 60 min. |
| Test 1 | 350–400°C | 600–650°C | 950–1000°C | catalyst gets deteriorated |
| Test 2 | do. | 450–500°C | 500–550°C | 500–550°C |
| Test 3 | do. | 500–550°C | 550–650°C | 550–650°C |

As is evident from the foregoing Table 4, the application of a catalyst reaction apparatus under the present invention prevents the overheating of the catalyst layer, bringing about a desirable effect.

In case of the application of an apparatus such as shown in FIG. 4, the result was practically the same as above.

What is claimed is:

1. A catalytic reaction apparatus for treating exhaust gases from combustion operations, comprising:
a catalyst container having inlet means for exhaust gas, outlet means for treated exhaust gas and a closed section defining a catalyst chamber between said inlet means and said outlet means, said catalyst chamber section having two opposing openings in the side wall thereof; a catalyst pack structure mounted on said catalyst chamber section and extending through said openings, said catalyst pack structure having an internal catalyst portion disposed entirely within said catalyst chamber and occupying substantially the entirety of the cross-sectional area thereof, two external cooling portions located at the opposite ends of said catalyst pack structure and disposed entirely outside of the respective openings in said catalyst chamber section and two closure walls disposed between said internal catalyst portion and said external cooling portions and closing the respective openings in said catalyst chamber section, said internal catalyst portion being disposed in said catalyst chamber between said closure walls and consisting essentially of a plurality of spaced-apart, thin, metal plates having catalyst composition firmly adhered on the surfaces thereof, said plates defining a plurality of flow passages therebetween so that the exhaust gas flows from said inlet means through said flow passages and thence into said outlet means, said external cooling portions being made of metal and being attached to said thin metal plates in heat conducting relationship therewith, said cooling portions having projecting cooling fins disposed outside of said catalyst container for transmitting heat to the ambient atmosphere.

2. A catalytic reaction apparatus according to claim 1, in which said closure walls and said external cooling portions are defined by a pair of monolithic metal members having slots on their opposing inner sides into which extend the ends of said thin metal plates, said members having a plurality of cooling fins projecting outwardly from the outer sides thereof, said members being secured in and closing said openings in the side wall of said catalyst chamber section.

3. A catalytic reaction apparatus according to claim 2, in which said thin metal plates are parallel and have a sinuous configuration when viewed in end view.

4. A catalytic reaction apparatus according to claim 2, in which said thin metal plates are parallel planar plates.

5. A catalytic reaction apparatus according to claim 4, in which said thin metal plates have a multiplicity of punched-out portions defining projections, each projection extending at an angle to the plane of its plate, said plates having through openings formed by punching out therefrom said projections.

6. A catalytic reaction apparatus for treating exhaust gases from combustion operations, comprising:
a catalyst container having inlet means for exhaust gas, outlet means for treated exhaust gas and a closed section defining a catalyst chamber between said inlet means and said outlet means, said catalyst chamber section having two opposing openings in the side wall thereof; a catalyst pack structure mounted on said catalyst chamber section and extending through said openings, said catalyst pack structure comprising a plurality of thin metal plates, two spaced-apart holding plates spaced from the ends of said thin metal plates and extending transversely thereto, said holding plates defining a pair of closure walls attached to said catalyst chamber section and respectively closing said openings therein, the central portions of said thin metal plates between said holding plates defining an internal catalyst portion disposed entirely within said catalyst chamber and occupying substantially the entirety of the cross-sectional area thereof and having catalyst composition firmly adhered on the surfaces thereof, said central portions of said thin metal plates defining a plurality of flow passages therebetween so that the exhaust gas flows from said inlet means through said flow passages and thence into said outlet means, the outer portions of said thin metal plates outside of said holding plates and outside of said catalyst chamber being free of catalyst composition and defining two external cooling portions outside of and on opposite sides of said catalyst chamber section, said outer portions of said thin metal plates defining projections cooling fins integral with said central portions of said thin metal plates and disposed outside of said catalyst container for transmitting heat to the ambient atmosphere.

7. A catalytic reaction apparatus for treating exhaust gases from combustion operations, comprising:
a catalyst container having a single centrally located inlet for exhaust gas, a single centrally located outlet for treated exhaust gas and an elongated, closed, hollow casing of rectangular cross-section defining a catalyst chamber section having a catalyst chamber therein, a flaring portion connecting said inlet to one end of said catalyst chamber section and a tapering portion connecting the other end of said catalyst chamber section to said outlet, said catalyst chamber section having opening means in the side wall thereof, a catalyst pack structure mounted on said catalyst chamber section and extending through said opening means, said catalyst pack structure having an internal catalyst portion disposed entirely within said catalyst chamber and occupying substantially the entirety of the cross-sectional area thereof, an external cooling portion disposed entirely outside of said catalyst chamber and closure wall means disposed between said internal catalyst portion and said external cooling portion and closing said opening means in said catalyst chamber section, said internal catalyst portion consisting essentially of a plurality of spaced-apart, thin, metal plates having catalyst composition firmly adhered on the surfaces thereof, said plates defining a plurality of flow passages therebetween so that the exhaust gas flows from said inlet means through said flow passages and thence into said outlet means, said external cooling portion being made of metal and being attached to said thin metal plates in heat conducting relationship therewith, said cooling portion having projecting cooling fins disposed outside of said catalyst container for transmitting heat to the ambient atmosphere.

* * * * *

UNITED STATES PATENT OFFICE
CERTIFICATE OF CORRECTION

Patent No. 3,819,334        Dated June 25, 1974

Inventor(s) Yoshinaga Yoshida, Toshiyuki Kii, Shigehiko Kobayashi, Kazuhide Miyazaki, Michiaki Yamamoto and Yasuo Seki It is certified that error appears in the above-identified patent and that said Letters Patent are hereby corrected as shown below:

Add to the "Foreign Application Priority Data" the following:

---Oct. 8, 1970    Japan ......... 45-87888---.

Col. 15, line 37; change "projections" to ---projecting---.

Signed and sealed this 5th day of November 1974.

(SEAL)
Attest:

McCOY M. GIBSON JR.        C. MARSHALL DANN
Attesting Officer            Commissioner of Patents